(12) United States Patent
Chen et al.

(10) Patent No.: US 11,481,634 B2
(45) Date of Patent: Oct. 25, 2022

(54) SYSTEMS AND METHODS FOR TRAINING A NEURAL NETWORK TO CONTROL AN AIRCRAFT

(71) Applicant: THE BOEING COMPANY, Chicago, IL (US)

(72) Inventors: Yang Chen, Westlake Village, CA (US); Deepak Khosla, Camarillo, CA (US); Kevin Martin, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 595 days.

(21) Appl. No.: 16/554,838

(22) Filed: Aug. 29, 2019

(65) Prior Publication Data

US 2021/0065003 A1   Mar. 4, 2021

(51) Int. Cl.
*G06N 3/08* (2006.01)
*G05D 1/00* (2006.01)
(Continued)

(52) U.S. Cl.
CPC .......... *G06N 3/082* (2013.01); *G05D 1/0088* (2013.01); *G05D 1/0808* (2013.01); *G05D 1/101* (2013.01); *G06F 7/58* (2013.01); *G09B 9/42* (2013.01)

(58) Field of Classification Search
CPC ...... G06N 3/082; G06N 3/006; G06N 3/0454; G06N 3/08; G05D 1/0088; G05D 1/0808;
(Continued)

(56) References Cited

U.S. PATENT DOCUMENTS 6,114,976 A * 9/2000 Vian ...................... B64D 25/10
340/963
6,332,105 B1* 12/2001 Calise .................. G05D 1/0825
700/48
(Continued)

FOREIGN PATENT DOCUMENTS

WO     WO-2018117872 A1 *   6/2018

OTHER PUBLICATIONS

NASA XPlaneconnect Wiki, https://github.com/nasa/XPlaneConnect/wiki, retrieved Aug. 21, 2020, 2 pgs.
(Continued)

*Primary Examiner* — Rami Khatib
(74) *Attorney, Agent, or Firm* — Moore IP Law

(57) ABSTRACT

A device includes a control input generator and a neural network trainer. A flight simulator is configured to generate first state data responsive to a first control input from the control input generator and to provide the first state data to a first neural network to generate a candidate second control input. The control input generator is also configured to select, based on a random value, a second control input from between the candidate second control input and a randomized offset control input that is based on a random offset applied to the first control input. The flight simulator is configured to generate second state data responsive to the second control input from the control input generator. The neural network trainer is configured to update weights of the first neural network based, at least in part, on the first state data and the second state data.

20 Claims, 6 Drawing Sheets

(51) Int. Cl.
G05D 1/08 (2006.01)
G05D 1/10 (2006.01)
G06F 7/58 (2006.01)
G09B 9/42 (2006.01)

(58) Field of Classification Search
CPC .. G05D 1/101; G06F 7/58; G09B 9/42; G09B 9/50; G09B 9/08; G05B 13/027
See application file for complete search history.

(56) References Cited

U.S. PATENT DOCUMENTS

| | | | |
|---|---|---|---|
| 11,150,655 B2* | 10/2021 | Zhou | G05D 1/0088 |
| 2004/0010354 A1* | 1/2004 | Nicholas | B64C 13/503 701/4 |
| 2011/0161267 A1* | 6/2011 | Chowdhary | G06N 3/08 706/21 |
| 2019/0004518 A1* | 1/2019 | Zhou | G05D 1/0088 |
| 2021/0123741 A1* | 4/2021 | Candido | G01C 21/20 |

OTHER PUBLICATIONS

Extended European Search Report for Application No. 20191631.9 dated Feb. 3, 2021, 7 pgs.

Kersandt, Kjell, et al. "Self-training by Reinforcement Learning for Full-autonomous Drones of the Future," 37th Digital Avionics System Conference, Sep. 2018, pp. 1-10.

Baomar, Haitham, et al., "An Intelligent Autopilot System that Learns Piloting Skills from Human Pilots by Imitation," 2016 International Conference on Unmanned Aircraft Systems, Jun. 7-10, 2016, Arlington, VA, 1023-1031.

Baomar, Haitham, et al., "Autonomous Landing and Go-around of Airliners Under Severe Weather Conditions Using Artificial Neural Networks," Research, Education and Development of Unmanned Aerial systems (RED-UAS), 2017, IEEE, 6 pgs.

Baomar, Haitham, et al., "Autonomous Navigation and Landing of Large Jets Using Artificial Neural Networks and Learning by Imitation," Conference: 2017 IEEE Symposium Series on Computational Intelligence, Nov. 2017, 11 pgs.

De Becdelievre, Jean, et al., "Autonomous Aerobatic Airplane Control with Reinforcement Learning," Stanford University, CS299: Machine Learning —Final Report, Dec. 15, 2016, 7 pgs.

Mnih, Volodymyr, et al., "Human-level control through deep reinforcement learning," Nature, vol. 518, Feb. 26, 2015, 13 pgs.

Van Hasselt, Hado, et al., "Deep Reinforcement Learning with Double Q-learning," Association for the Advancement of Artificial Intelligence, vol. 2, 2016, 13 pgs.

Wang, Ziyu, et al., "Dueling Network Architectures for Deep Reinforcement Learning," Cornell University, arXiv.org > cs > arXiv:1511.06581, Apr. 5, 2016, 15 pgs.

* cited by examiner

SYSTEMS AND METHODS FOR TRAINING A NEURAL NETWORK TO CONTROL AN AIRCRAFT

FIELD OF THE DISCLOSURE

The present disclosure is generally related to training a neural network to control an aircraft.

BACKGROUND

Although advances in artificial intelligence and machine learning are making self-driving vehicles an achievable target, aircraft continue to be operated by pilots. Collecting data from human pilots for training an autonomous aircraft can be time consuming and costly. The collected training data that is based on previous pilot experience would not cover potential new scenarios that the aircraft could encounter.

SUMMARY

In a particular implementation, a device for training a neural network to control an aircraft includes a memory, a control input generator, and a neural network trainer. The memory is configured to store a first neural network. The control input generator is configured to provide a first control input to a flight simulator. The flight simulator is configured to generate first state data responsive to the first control input and to provide the first state data as input to the first neural network to generate a candidate second control input. The control input generator is also configured to select, based on a random value, a second control input for the flight simulator. The second control input is selected from between the candidate second control input and a randomized offset control input. The randomized offset control input is based on a random offset applied to the first control input. The control input generator is further configured to provide the second control input to the flight simulator. The flight simulator is configured to generate second state data responsive to the second control input. The neural network trainer is configured to update weights of the first neural network based, at least in part, on the first state data and the second state data.

In another particular implementation, a method of training a neural network to control an aircraft includes providing a first control input to a flight simulator. The flight simulator generates first state data responsive to the first control input and provides the first state data as input to a first neural network to generate a candidate second control input. The method also includes selecting, based on a random value, a second control input for the flight simulator. The second control input is selected from between the candidate second control input and a randomized offset control input. The randomized offset control input is based on a random offset applied to the first control input. The method further includes providing the second control input to the flight simulator. The flight simulator generates second state data responsive to the second control input. The method also includes updating weights of the first neural network based, at least in part, on the first state data and the second state data.

In another particular implementation, a computer-readable storage device stores instructions that, when executed by one or more processors, cause the one or more processors to initiate, perform, or control operations to train a neural network to control an aircraft. The operations include providing a first control input to a flight simulator. The flight simulator generates first state data responsive to the first control input and provides the first state data as input to a first neural network to generate a candidate second control input. The operations also include selecting, based on a random value, a second control input for the flight simulator. The second control input is selected from between the candidate second control input and a randomized offset control input. The randomized offset control input is based on a random offset applied to the first control input. The operations further include providing the second control input to the flight simulator. The flight simulator generates second state data responsive to the second control input. The operations also include updating weights of the first neural network based, at least in part, on the first state data and the second state data.

The features, functions, and advantages described herein can be achieved independently in various implementations or may be combined in yet other implementations, further details of which can be found with reference to the following description and drawings.

DETAILED DESCRIPTION

Figure 1:
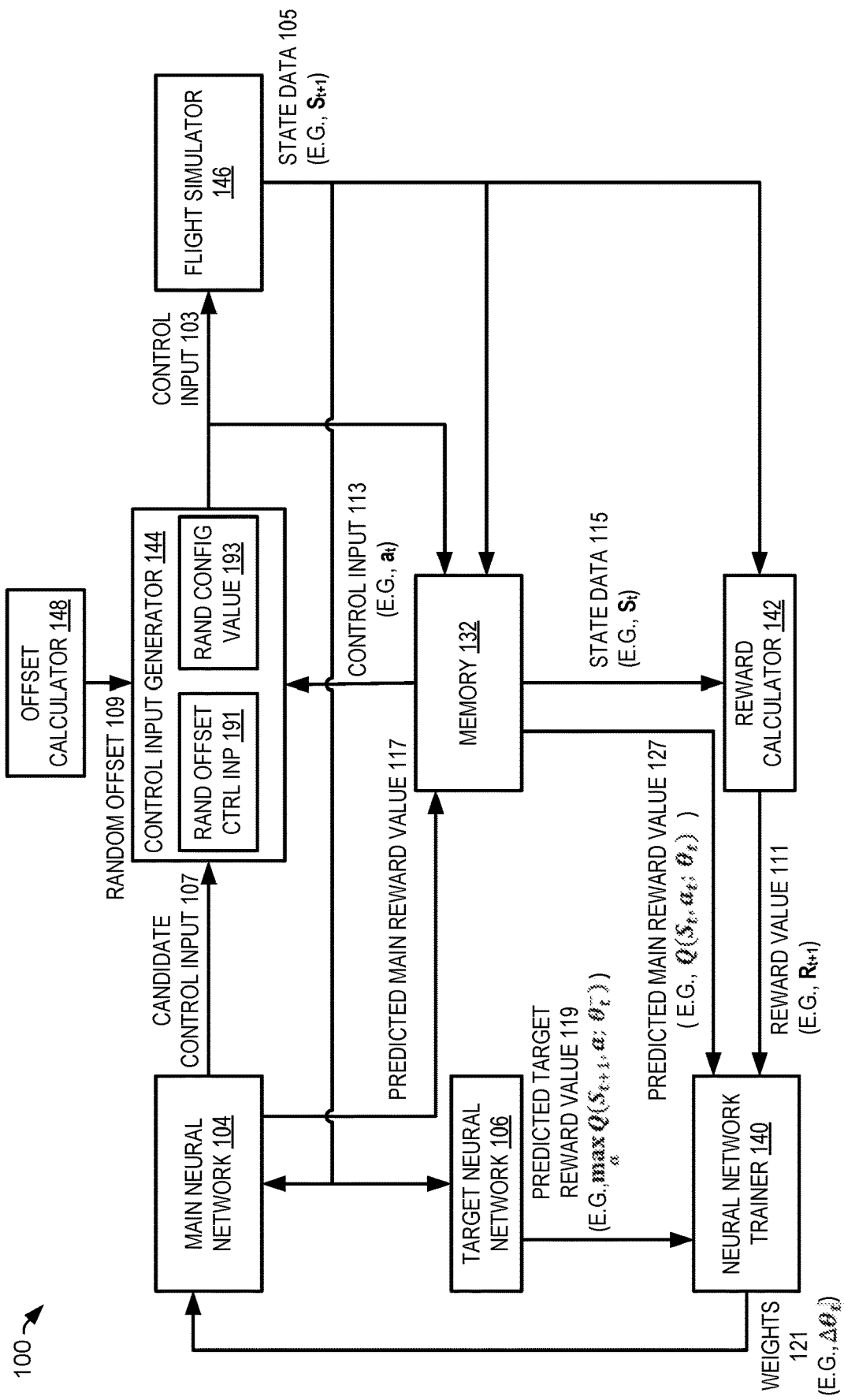
FIG. 1 is a diagram that illustrates a system configured to train a neural network to control an aircraft.

Aspects disclosed herein present systems and methods for training a neural network to control an aircraft. A neural network is trained by providing control inputs to a flight simulator, determining reward values based on state data generated by the flight simulator responsive to the control inputs, and updating weights of the neural network based on the reward values. The state data indicates a state of an aircraft simulation of a particular aircraft type in the flight simulator. The neural network is configured to generate, based on weights of the neural network, control inputs responsive to state data. The trained neural network can be used to control an aircraft (e.g., a real-world aircraft) of the particular aircraft type. Training the neural network based on a flight simulator, as compared to pilot data, consumes fewer resources (e.g., time and money). The neural network trained using a flight simulator is also likely to be more robust because the flight simulator can be designed to simulate various scenarios, including scenarios that are not commonly encountered by pilots.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. For ease of reference herein, such features are generally introduced as "one or more" features, and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to train a neural network to control an aircraft. The system 100 includes a flight simulator 146 communicatively coupled to a target neural network 106, a main neural network 104, a memory 132, or a combination thereof. For example, the flight simulator 146 is configured to exchange data with the target neural network 106, the main neural network 104, the memory 132, or a combination thereof. The system 100 includes a reward calculator 142 coupled to the flight simulator 146, the memory 132, or both. The system 100 includes a neural network trainer 140 coupled to the memory 132, the reward calculator 142, the target neural network 106, the main neural network 104, or a combination thereof. The system 100 also includes a control input generator 144 coupled to the memory 132, the main neural network 104, an offset calculator 148, the flight simulator 146, or a combination thereof.

In a particular aspect, the neural network trainer 140 is configured to train the main neural network 104 based on deep Q-Network techniques (DQN) techniques. For example, the neural network trainer 140 trains the main neural network 104 using a target neural network 106 that corresponds to a delayed copy of the main neural network 104. To illustrate, the neural network trainer 140 is configured to, in response to determining that at least a threshold count of updates have been performed on weights of the main neural network 104 subsequent to a previous update of weights of the target neural network 106, update the weights of the target neural network 106 by copying the weights of the main neural network 104.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

In a particular aspect, the neural network trainer 140 is configured to use a reinforcement learning mechanism to train the main neural network 104. The reinforcement learning mechanism attempts to increase or maximize a reward value (calculated by the reward calculator 142). In a particular example, the flight simulator 146 generates state data representing a state of an aircraft simulation. The main neural network 104 generates a control input based on the state data. For example, the main neural network 104 uses the state data as input and generates a plurality of predicted main reward values for a plurality of outputs. As used herein, a "predicted main reward value" refers to a reward value that the main neural network 104 predicts will result if a particular one of the plurality of outputs is provided as a control input to the flight simulator 146. Each of the plurality of outputs corresponds to a different control input. In a particular example, if the main neural network 104 is trained to control an elevator setting of an aircraft, the plurality of outputs corresponds to various elevator setting values (e.g., elevator position angles) that can be provided as inputs to the flight simulator 146. In this example, the predicted main reward value for a particular elevator setting value indicates the reward value that the main neural network 104 predicts that the reward calculator 142 will generate if the particular elevator setting value is provided as control input to the flight simulator 146. In a particular implementation, a predicted main reward value 117 is a vector including a set of reward values including one predicted reward value for each possible control input. For example, when the control inputs correspond to elevator setting values, the predicted main reward value 117 can indicate a predicted reward value for each allowed elevator setting value. Alternatively, the predicted main reward value 117 can include a single value corresponding to the highest predicted reward value of the vector.

The vector of predicted main reward values, the highest predicted reward value, or information identifying a control input associated with the highest predicted main reward value of the plurality of main reward values is provided to the control input generator 144 to indicate a candidate control input 107. The control input generator 144 selects or generates a control input provided to the flight simulator 146. The flight simulator 146 generates new state data based on the control input provided by the control input generator 144. The reward calculator 142 determines a reward value (e.g., an actual reward value or a detected reward value) based on a change in the aircraft simulation state indicated by the state data (e.g., based on a comparison of prior state data with the new state data).

The neural network trainer 140 updates the main neural network 104 based, at least in part, on the reward value. For example, the neural network trainer 140 determines weights 121 based on the reward value and updates weighted node-connections of the main neural network 104 based on the weights 121. The main neural network 104 is thus trained to generate control inputs that result in "good" reward values (e.g., positive reward values) and to refrain from generating control inputs that result in "bad" reward values (e.g., negative reward values).

In a particular aspect, the neural network trainer 140 is configured to train the main neural network 104 based on the target neural network 106, which is a delayed copy of the main neural network 104. For example, the neural network trainer 140 updates the main neural network 104 based, at least in part, on a predicted target reward value 119 generated by the target neural network 106 for a particular simulation time step (t+1) and a predicted main reward value 127 generated by the main neural network 104 for a previous simulation time step (t). As used herein, a "predicted target reward value" refers a reward value that the target neural network 106 predicts will result if a particular control input is provided to the flight simulator 146. Like the main neural network 104, the target neural network 106 generates, based on state data 105 from the flight simulator 146, a plurality of predicted target reward values with each predicted target reward value 119 corresponding to a possible control input. In a particular implementation, the predicted target reward value 119 is a vector including a set of reward values including one predicted reward value for each possible control input. For example, when the control inputs correspond to elevator setting values, the predicted target reward value 119 can indicate a predicted reward value for each allowed elevator setting value. Alternatively, the predicted target reward value 119 can include a single value corresponding to the highest predicted reward value of the vector.

The neural network trainer 140 updates the main neural network 104 based on the predicted main reward value 127 and the predicted target reward value 119. In a particular aspect, the target neural network 106 is more stable than the main neural network 104 because the target neural network 106 is updated less frequently. Updating the main neural network 104 based on predicted target reward values of the target neural network 106 (e.g., the delayed neural network) reduces a likelihood of the main neural network 104 falling into destabilizing feedback loops.

In a particular aspect, the control input generator 144 is configured to randomly select between a candidate control input 107 based on the output of the main neural network 104 and a randomized control input. The control input generator 144 is configured to provide the selected control input to the flight simulator 146. Using randomized control inputs in addition to control inputs generated by the main neural network 104 enables the more robust training of the main neural network 104. For example, training of the main neural network 104 can include state data responsive to control inputs (e.g., randomized control inputs) that are less likely to be generated by the main neural network 104.

In a particular aspect, one or more components (e.g., the main neural network 104, the target neural network 106, the neural network trainer 140, the reward calculator 142, the control input generator 144, the flight simulator 146, the offset calculator 148, or a combination thereof) of the system 100 can be implemented, at least in part, by one or more processors executing one or more instructions. The one or more components can be implemented as a single processor or as multiple processors, such as in a multi-core configuration, a multi-processor configuration, a distributed computing configuration, a cloud computing configuration, or any combination thereof. In some implementations, one or more portions of the one or more components of the system 100 are implemented by a processor using dedicated hardware, firmware, or a combination thereof.

During operation, the flight simulator 146 generates state data 105 indicating a state of an aircraft simulation. In a particular example, the flight simulator 146 is configured to generate the state data 105 at particular simulation time steps. For example, the flight simulator 146 generates the state data 105 corresponding to a particular simulation time step (t+1). A simulation time step represents passage of a particular time interval (e.g., 5 minutes) for the aircraft simulation. In a particular aspect, the flight simulation can be real-time (e.g., 5 seconds of simulated flight occur for each 5 seconds of real-world clock time). Alternatively, the flight simulation can occur at a different rate (e.g., 120 minutes of simulated flight can occur during 120 seconds of real-world time). Further, the simulated time steps can be evenly spaced or unevenly spaced. For example, first time intervals can be used during a take-off phase of simulated flight, and second time intervals can be used during a cruise phase of simulated flight.

The state data 105 is a vector including values indicating a state of an aircraft during (e.g., at the beginning of, in the middle of, or at the end of) a particular simulation time step (t+1) of a flight simulation. In a particular aspect, the state data 105 indicates an altitude, a speed, a pitch, an elevator setting, an altitude change, a speed change, a pitch change, or a combination thereof, of the aircraft during the particular simulation time step (t+1).

The flight simulator 146 stores the state data 105 associated with the particular simulation time step (t+1) in the memory 132 for reward value calculation associated with a subsequent simulation time step. The flight simulator 146 provides the state data 105 to the reward calculator 142, the target neural network 106, the main neural network 104, or a combination thereof. Alternatively, the reward calculator 142, the target neural network 106, the main neural network 104, or a combination thereof, retrieve the state data 105 from the flight simulator 146 or the memory 132.

The reward calculator 142, in response to receiving the state data 105 for the particular simulation time step (t+1) from the flight simulator 146, retrieves state data 115 for a previous simulation time step (t) from the memory 132. The reward calculator 142 determines a reward value 111 for the particular simulation time step (t+1) based on a comparison of the state data 105 for the particular simulation time step (t+1) and the state data 115 for the previous simulation time step (t). In a particular aspect, the reward calculator 142 determines the reward value 111 based on a reward function. The reward function can be based on a configuration setting, a default value, a user input, or a combination thereof. In a particular aspect, the reward calculator 142 determines the reward value 111 (R) during a take-off simulation based on the following reward function:

$$R = \begin{cases} 1, & \text{if } \Delta\text{altitude} > 1 \text{ meter and} \\ & \text{(pitch is between or converging to } 12 \sim 13) \\ -1, & \text{if } \Delta\text{altitude} < -1 \text{ meter} \\ 0, & \text{otherwise} \end{cases}$$

In a particular example, the state data 115 indicates a first altitude and a first pitch of the aircraft simulation, and the state data 105 indicates a second altitude and a second pitch of the aircraft simulation. The reward calculator 142 determines an altitude change based on a comparison of the first altitude and the second altitude (e.g., altitude change=the second altitude−the first altitude). The reward calculator 142 determines a pitch change based on a comparison of the first pitch and the second pitch (e.g., pitch change=the second pitch−the first pitch).

In a particular aspect, the reward calculator 142 determines that the pitch is converging in response to determining that the second pitch is less than the first threshold pitch (e.g., 12 degrees) and that the pitch change is positive or that the second pitch is greater than the second threshold pitch (e.g., 13 degrees) and the pitch change is negative. The reward calculator 142, in response to determining that the altitude change is greater than a first threshold altitude (e.g., 1 meter) and the second pitch is greater than or equal to a first threshold pitch (e.g., 12 degrees), the second pitch is less than or equal to a second threshold pitch (e.g., 13 degrees), or that the pitch is converging, sets the reward value 111 to a positive value (e.g., 1). In this example, the positive value indicates that the state data 105 indicates a "good" state for take-off because the aircraft is gaining altitude by more than the first threshold altitude and the pitch is either converging to or is already between the first pitch threshold and the second pitch threshold.

Alternatively, the reward calculator 142, in response to determining that the altitude change is less than a second threshold altitude (e.g., −1 meter), sets the reward value 111 to a negative value (e.g., −1). In this example, the negative value indicates that the state data 105 indicates a "bad" state for take-off because the aircraft is losing altitude by more than the second threshold altitude.

In a particular aspect, the reward calculator 142, in response to determining that the altitude change is greater than or equal to the second threshold altitude (e.g., −1 meter) and less than or equal to the first threshold altitude (e.g., 1 meter), sets the reward value 111 to a neutral value (e.g., 0). In this example, the neutral value indicates a "neutral" state for take-off because the aircraft is not changing altitude by much (e.g., between the first altitude threshold and the second altitude threshold). Alternatively, the reward calculator 142, in response to determining that the altitude change is greater than the first threshold altitude (e.g., 1 meter), that the second pitch is less than the first pitch threshold (e.g., 12) or greater than the second pitch threshold (e.g., 13), and that the pitch is not converging, sets the reward value 111 to the neutral value (e.g., 0.0). In this example, the neutral value indicates a "neutral" state for take-off because the aircraft is gaining altitude but the pitch is too low or too high and is not converging.

It should be understood that a reward function for take-off based on altitude and pitch is provided as an illustrative non-limiting example. In other examples, the reward calculator 142 is configured to determine reward values based on reward functions associated with various stages of flight (e.g., cruising, landing, turning, taxiing, parking, or a combination thereof). The reward functions can be based on various aircraft state data (e.g., pitch, yaw, roll, heading, altitude, fuel consumption, temperature sensor data, other types of sensor data, or a combination thereof).

The reward calculator 142 provides the reward value 111 to the neural network trainer 140. Alternatively, the neural network trainer 140 retrieves the reward value 111 from the reward calculator 142 or from the memory 132. The neural network trainer 140, in response to receiving the reward value 111 for the particular simulation time step (t+1), retrieves, from the memory 132, a predicted main reward value 127 for the previous simulation time step (t) and data indicating the control input 113 provided to the flight simulator 146 in the previous simulated time step (t). For example, the state data 105 is generated based on the control input 113 of the previous simulation time step (t), and the main neural network 104 previously generated the predicted main reward value 127 for a candidate control input for the previous simulation time step (t) used to select the control input 113.

In a particular aspect, the neural network trainer 140, in response to determining that the control input 113 corresponds to a candidate control input generated by the main neural network 104 for the previous simulation time step (t), determines weights 121 based on the predicted main reward value 127 of the candidate control input for the previous simulation time step (t). In a particular implementation, the neural network trainer 140, in response to determining that the control input 113 corresponds to a randomized offset control input generated by the control input generator 144 for the previous simulation time step (t), refrains from determining the weights 121 based on the predicted main reward value 127 and refrains from updating the main neural network 104. In an alternative implementation, the neural network trainer 140, in response to determining that the control input 113 corresponds to a randomized offset control input for the previous simulation time step (t) retrieves the predicted main reward value 127 corresponding to the randomized offset control input (as compared to the candidate control input) for the previous simulation time step (t). The neural network trainer 140 determines the weights 121 based on the predicted main reward value 127, as described herein.

Figure 2:
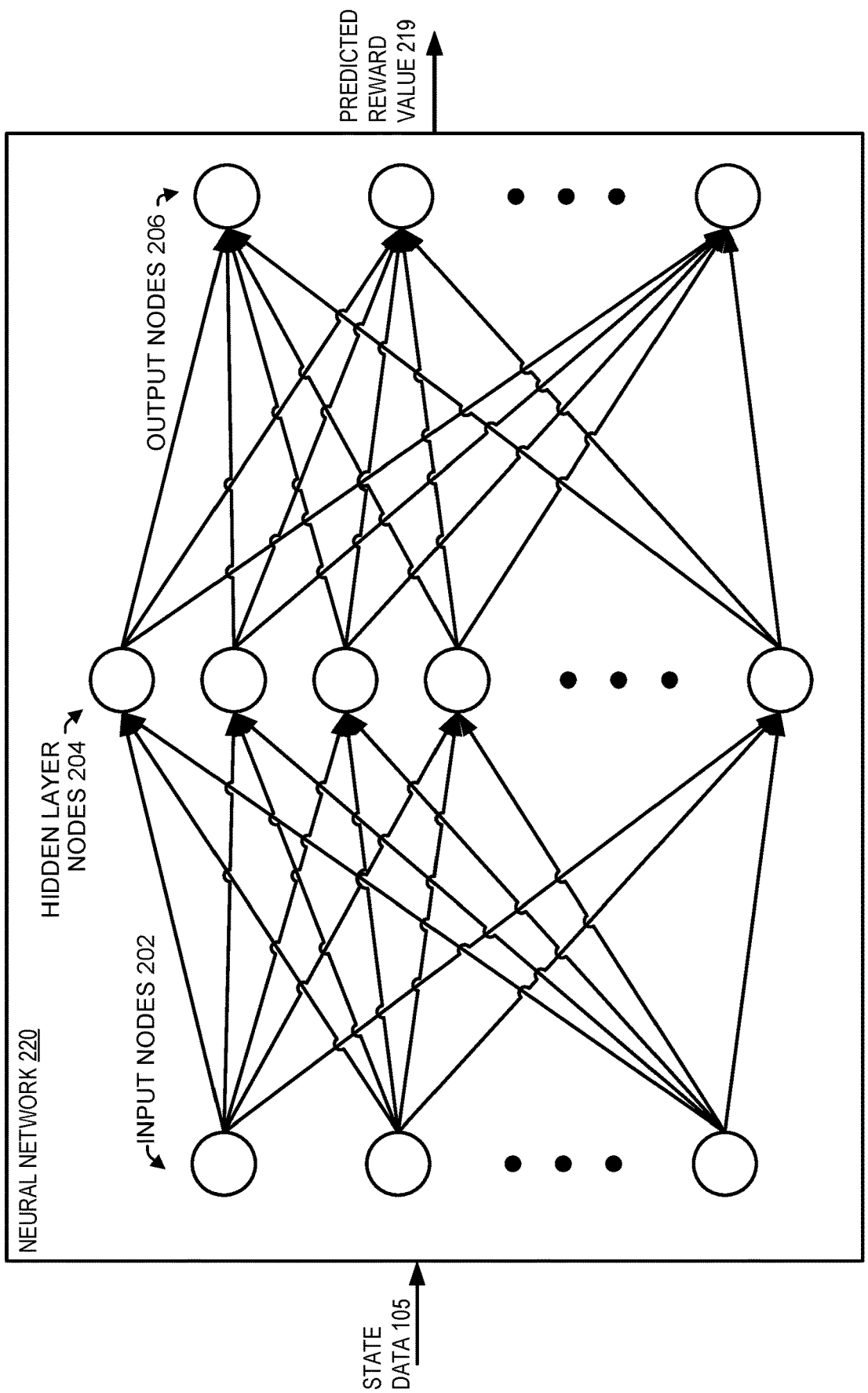
FIG. 2 is a diagram of an example of a neural network of the system of FIG. 1.

The target neural network 106 generates a predicted target reward value 119 based on the state data 105 for the particular simulation step (t+1). In the example illustrated in FIG. 2, a neural network 220 includes a plurality of input nodes 202, a hidden layer including a plurality of hidden layer nodes 204, and a plurality of output nodes 206. In a particular aspect, the input nodes 202 are fully connected via a first plurality of weighted node-connections to the hidden layer. In a particular aspect, the hidden layer is fully connected via a second plurality of weighted node-connections to the output nodes 206. In a particular aspect, the hidden layer includes a first count (e.g., 40) of hidden layer nodes 204. A higher count of hidden layer nodes 204 enable the neural network 220 to account for higher variability. A lower count of hidden layer nodes 204 enables faster processing time to generate values of the output nodes 206. Although FIG. 2 illustrates the neural network 220 with a single hidden layer, in other implementations the neural network 220 includes multiple hidden layers.

In a particular aspect, the neural network 220 corresponds to the target neural network 106, the main neural network 104 of FIG. 1, or both. In a particular example, each of the input nodes 202 is associated with a particular type of data (e.g., a particular value of the state data 105). To illustrate, a first input node 202 is associated with pitch, a second input node 202 is associated with altitude, a third input node 202 is associated with speed, a fourth input node 202 is associated with elevator setting, a fifth input node 202 is associated pitch change, a sixth input node is associated with altitude change, a seventh input node is associated with speed change, or a combination thereof. It should be understood that seven input nodes are provided as an illustrative example, in other examples the input nodes 202 include fewer than seven input nodes or more than seven input nodes.

In a particular aspect, normalized values are provided to one or more of the input nodes 202. For example, a normalized pitch value, a normalized altitude, and a normalized speed are provided to the first input node 202, the second input node 202, and the third input node 202, respectively. To illustrate, a valid pitch value ranges from a first pitch value (e.g., −60 degrees) to a second pitch value (e.g., 60 degrees). A pitch value (e.g., 30 degrees) is normalized (e.g., by the flight simulator 146, the neural network 220, or another component of the system 100) to generate a normalized pitch value (e.g., 0.5) that is within a first normalized pitch value (e.g., −1) and a second normalized pitch value (e.g., 1). The normalized pitch value is provided to the first input node 202.

The neural network 220 (e.g., a neural network engine) determines a value of each of the hidden layer nodes 204 as a weighted sum of the values applied to the input nodes 202. The neural network 220 determines output values of the output nodes 206 as a weighted sum of the values of the hidden layer nodes 204. For example, the neural network 220 generates an output value (e.g., a predicted reward value) of each of the output nodes 206 as a weighted sum of the values of the hidden layer nodes 204.

Each of the output nodes 206 corresponds to a particular control input for the flight simulator 146. In a particular example, the neural network 220 is configured to generate a control input to control an elevator setting of the aircraft simulation, and the elevator setting has a range of values (e.g., control inputs) between a first elevator setting (e.g., −1) and a second elevator setting (e.g., 1). In this example, each of the output nodes 206 corresponds to a particular value of the range. To illustrate, the neural network 220 includes a first output node, a second output node, a third output node, a fourth output node, and a fifth output node corresponding to a first control input (e.g., −1), a second control input (e.g., −0.5), a third control input (e.g., 0), a fourth control input (e.g., 0.5), and a fifth control input (e.g., 1), respectively. Although five output nodes 206 are illustrated in FIG. 2, in other implementations the neural network 220 includes fewer than five or more than five output nodes 206. In a particular aspect, a higher count of output nodes 206 (e.g., seventeen rather than five) enables more gradual changes and finer aircraft control than does a lower count of output nodes 206; however, a lower count of output nodes 206 enables faster processing time to determine values of the output nodes 206.

In a particular aspect, the neural network 220 outputs a vector of predicted reward values or data identifying an output node 206 having a highest predicted reward value of the predicted reward values generated by the neural network 220. For example, the output data can include or identify the predicted reward value 219, the control input associated with output node 206, or both. In a particular aspect, the neural network 220 outputs data (e.g., a vector) indicating the control inputs and the corresponding predicted reward values.

In a particular example, the target neural network 106 (e.g., a target neural network engine) applies the pitch (e.g., the normalized pitch), the altitude (e.g., the normalized altitude), the speed (e.g., the normalized speed), and the elevator setting indicated by the state data 105 to the first input node 202, the second input node 202, the third input node 202, and the fourth input node 202, respectively. In some implementations, the target neural network 106 (e.g., the target neural network engine) determines a pitch change based on a comparison of a first pitch indicated by the state data 115 and the pitch indicated by the state data 105, an altitude change based on a comparison of a first altitude indicated by the state data 115 and the altitude indicated by the state data 105, a speed change based on a comparison of a first speed indicated by the state data 115 and the speed indicated by the state data 105, or a combination thereof. In such implementations, the target neural network 106 (e.g., the target neural network engine) applies the pitch change, the altitude change, and the speed change to the fifth input node 202, the sixth input node 202, and the seventh input node 202, respectively. The target neural network 106 generates output values (e.g., predicted reward values) of the output nodes 206. In a particular aspect, the predicted reward value 219 (e.g., the highest predicted reward value of the predicted reward values) corresponds to the predicted target reward value 119 for the particular simulation time step (t+1).

Returning to FIG. 1, the target neural network 106 provides the predicted target reward value 119 for the particular simulation time step (t+1) to the neural network trainer 140, or the neural network trainer 140 retrieves the predicted target reward value 119 from the target neural network 106 or the memory 132. The neural network trainer 140 determines weights 121 based on the predicted target reward value 119 for the particular simulation time step (t+1), the predicted main reward value 127 for the previous simulation time step (t), the reward value 111 for the particular simulation time step (t+1), or a combination thereof. In a particular aspect, the weights 121 are determined to reduce (e.g., minimize) the following loss (or cost) function:

$$L_t(\theta_t) = E\left[\left(R_{t+1} + \gamma \max_a Q(S_{t+1}, a; \theta_t^-) - Q(S_t, a_t; \theta_t)\right)^2\right]$$ Equation 1 where $L_t(\theta_t)$ corresponds to the loss function for training (e.g., determining the weights 121 for) the main neural network 104 (e.g., represented by the weights $\theta_t$). $R_{t+1}$ corresponds to the reward value 111 for the particular simulation time step (t+1). Q(S, α; θ) represents the function of a neural network with weights θ (either the main neural network 104 or the target neural network 106) given a set of input S (e.g., state data) with output values of the neural network indexed by α (e.g., a control input or action). $\max_\alpha Q(S_{t+1}, \alpha; \theta_t^-)$ corresponds to the predicted target reward value 119 generated by the target neural network 106 (e.g., represented by the weights $\theta_t^-$) for the particular simulation time step (t+1) for the output α having the maximum value. $Q(S_t, \alpha_t; \theta_t)$ corresponds to the predicted main reward value 127 generated by the main neural network 104 for the previous simulation time step (t). γ corresponds to a discount value (e.g., 0.99). In a particular aspect, the discount value is based on a configuration setting, a default value, a user input, or a combination thereof. In a particular aspect, the loss function corresponds to an expectation of the squared difference between the predicted target reward value 119 for the particular simulation time step (t+1) and the predicted main reward value 127 for the previous simulation time step (t).

In a particular aspect, reducing (e.g., minimizing) the loss (or cost) function results in updating the main neural network 104 as indicated by the following formula:

$$\theta_{t+1} = \theta_t + \alpha(Y_t^Q - Q(S_t, \alpha_t; \theta_t)) \nabla_{\theta_t} Q(S_t, \alpha_t; \theta_t) \quad \text{Equation 2}$$

where $\theta_t$ corresponds to the main neural network 104, $\theta_{t+1}$ corresponds to an updated version of the main neural network 104 subsequent to applying the weights 121, a corresponds to a learning rate, and $Q(S_t, \alpha_t; \theta_t)$ corresponds to the predicted main reward value 127 for the previous simulation time step (t). In a particular aspect, the learning rate is based on a configuration setting, a default value, a user input, or a combination thereof. In a particular aspect, the neural network trainer 140 determines $Y_t^Q$ based on the following formula:

$$y_t^Q \equiv R_{t+1} + \gamma \max_a Q(S_{t+1}, a; \theta_t^-) \quad \text{Equation 3}$$

where $R_{t+1}$ corresponds to the reward value 111 for the particular simulation time step (t+1), $$\max_a Q(S_{t+1}, a; \theta_t^-)$$

corresponds to the predicted target reward value 119 for the particular simulation time step (t+1), and γ corresponds to a discount value (e.g., 0.99). The neural network trainer 140 updates the main neural network 104 based on the weights 121. For example, when the main neural network 104 corresponds to the neural network 220 of FIG. 2, the neural network trainer 140 updates weights of the first plurality of weighted connections between the input nodes 202 and the hidden layer nodes 204, the second plurality of weighted connections between the hidden layer nodes 204 and the output nodes 206, or a combination thereof.

In a particular aspect, a simulation time step corresponds to an action cycle. Action cycle data associated with the particular simulation time step (t+1) includes the state data 115, the state data 105, the reward value 111, the control input 113, a candidate control input associated with the particular simulation time step (t), the predicted target reward value 119, the predicted main reward value 127, the weights 121, or a combination thereof.

The neural network trainer 140 updates the main neural network 104 during a learning cycle. In a particular aspect, the neural network trainer 140 updates the main neural network 104 based on action cycle data of a single action cycle. For example, the neural network trainer 140 updates the main neural network 104 at a first time based on first action cycle data of the previous simulation time step (t), and updates the main neural network 104 at a second time based on second action cycle data of the particular simulation time step (t+1). In an alternative aspect, the neural network trainer 140 updates the main neural network 104 at a particular time based on action cycle data associated with multiple action cycles. In a particular example, the memory 132 includes a first-in first-out (FIFO) memory buffer that stores action cycle data associated with a threshold number (e.g., 12000) of action cycles. In a particular aspect, the threshold number of action cycles corresponds to a replay memory size. The neural network trainer 140 retrieves action cycle data associated with a batch size (e.g., 128) of action cycles from the memory 132 as a mini-batch. In a particular aspect, the mini-batch includes action cycle data of a random set of action cycles. For example, the mini-batch includes action cycle data of 128 random action cycles from the 12000 most recent action cycles. The neural network trainer 140 updates the main neural network 104 at a particular time based on the mini-batch. In a particular example, the mini-batch includes first action cycle data associated with the particular simulation time step (t+1) and second action cycle data associated with a second simulation time step. The neural network trainer 140 determines the weights 121 based on the first action cycle data and second weights based on the second action cycle data. The neural network trainer 140 updates the main neural network 104 based on the weights 121, the second weights, or a combination thereof.

The main neural network 104 (e.g., a main neural network engine) generates predicted main reward values for the state data 105. The predicted main reward values generated by the main neural network 104 for the state data 105 can differ from the predicted target reward values generated by the target neural network 106 for the state data 105 when weights (e.g., the weights 121) of the main neural network 104 differ from weights of the target neural network 106.

The main neural network 104 (e.g., a main neural network engine) generates output indicating the predicted main reward values 117 (or at least a highest predicted main reward value of the predicted main reward values). In FIG. 1, the predicted main reward value 117 indicates or corresponds to a candidate control input 107 for the particular simulation time step (t+1) to the control input generator 144. The main neural network 104 stores the predicted main reward value 117 associated with the candidate control input 107 for the particular simulation time step (t+1) in the memory 132. In a particular aspect, the main neural network 104 stores the predicted main reward values 117 and corresponding control inputs to the memory 132.

The control input generator 144, in response to receiving the candidate control input 107 for the particular simulation step (t+1), retrieves the control input 113 for the previous simulation step (t) from the memory 132. The offset calculator 148 (e.g., a random number generator) generates a random offset 109 between a first offset (e.g., −0.5) and a second offset (e.g., 0.5). The control input generator 144 generates a random offset control input 191 for the particular simulation time step (t+1) based on the random offset 109 and the control input 113 for the previous simulation time step (t) (e.g., random offset control input 191=control input 113+random offset 109). The control input generator 144 thus generates the random offset control input 191 by randomly selecting a value from within a range (e.g., −0.5 to +0.5) centered on a value of the control input 113. In a particular aspect, the random offset control input 191 is between a first elevator setting (e.g., −1) and a second elevator setting (e.g., 1).

In a particular aspect, the control input generator 144 determines that the control input 113 corresponds to a first output node (e.g., an 8th output node) of the main neural network 104. The control input generator 144 identifies a second output node (e.g., a $10^{th}$ output node) based on the first output node (e.g., 8th output node) and the random offset 109 (e.g., 2). For example, a second identifier of the second output node is based on a sum of a first identifier of the first output node and the random offset 109 (e.g., second identifier=(first identifier+random offset 109) modulus (count of output nodes)). The control input generator 144 designates a particular control input corresponding to the second output node as the random offset control input 191. In this aspect, the random offset 109 includes a random value between a first value (e.g., −2) and a second value (e.g., 2). The control input generator 144 thus generates the random offset control input 191 by randomly selecting a value from within a range centered on a value of the control input 113. The range is from a first control input corresponding to a first output node (e.g., −2nd output node) to a second control input corresponding to a second output node (e.g., +2nd output node). Generating the random offset control input 191 by randomly selecting a value from within a range centered on a value of the control input 113 corresponds to performing a "random-walk" scheme. In some aspects, the random-walk scheme is suitable for aircraft controls (e.g., elevator setting) that tend to be relatively continuous in real-life as compared to aircraft controls that tend to have discrete state, such as flaps that vary between extended and not extended.

The control input generator 144 selects one of the candidate control input 107 or the randomized offset control input 191 as a control input 103 for the particular simulation time step (t+1). For example, the control input generator 144 generates a particular random value between a first value (e.g., 0.0) and a second value (e.g., 1.0). The control input generator 144 determines a randomization configuration value 193 based on a count of iterations of training the main neural network 104 (e.g., t+1). For example, the control input generator 144, in response to determining that the count of iterations (e.g., t+1) is less than an observation threshold (e.g., 3000), sets the randomization configuration value 193 to the first value (e.g., 0.0). Setting the randomization configuration value 193 to the first value increases a likelihood that a randomized offset control input 191 is selected during an observation period corresponding to fewer training iterations than the observation threshold.

In a particular aspect, the control input generator 144, in response to determining that the count of iterations (e.g., t+1) is greater than or equal to the observation threshold (e.g., 3000), sets the randomization configuration value 193 between a first value (e.g., 0.01) and a second value (e.g., 1.0) using a linear function based on the count of iterations (e.g., t+1). For example, the linear function generates the randomization configuration value 193 linearly increasing from the first value (e.g., 0.01) to the second value (e.g., 1.0) from a first training iteration (e.g., 3000) to a second training iteration (e.g., 6000). Linearly increasing the randomization configuration value 193 linearly decreases a likelihood that a random offset control input 191 is selected during an exploration period that is subsequent to the observation period.

The control input generator 144, in response to determining that the particular random value is greater than the randomization configuration value 193, selects the random offset control input 191 as the control input 103. In a particular aspect, selecting random offset control inputs for at least some of the simulation time steps during the observation period enables exploration of more aircraft simulation state and control input combinations and increases robustness of the main neural network 104. Alternatively, the control input generator 144, in response to determining that the particular random value is less than or equal to the randomization configuration value 193, selects the candidate control input 107 as the control input 103. In a particular aspect, selecting more of the candidate control inputs during the exploration period enables behavior of the main neural network 104 to converge.

In a particular aspect, the control input generator 144 stores data identifying the control input 103 for the particular simulation time step (t+1) in the memory 132. The control input generator 144 provides the control input 103 for the particular simulation time step (t+1) to the flight simulator 146. In a particular aspect, the neural network trainer 140, subsequent to updating the main neural network 104 based on the weights 121 and in response to determining that the main neural network 104 has been updated at least a threshold number of times subsequent to a previous update of the target neural network 106, updates the target neural network 106 by copying the main neural network 104. For example, the neural network trainer 140 updates the target neural network 106 to have the same weights (e.g., the weights 121) as the main neural network 104.

In a particular aspect, the flight simulator 146, in response to determining that the particular simulation time step (t+1) is less than an exploration threshold (e.g., 6000) generates second state data for a next simulation time step (t+2) based on the control input 103. The training of main neural network 104 continues based on the state data 105 and the second state data according to the techniques described herein. Alternatively, the flight simulator 146, in response to determining that the particular simulation time step (t+1) is greater than or equal to the exploration threshold (e.g., 6000) generates an output indicating that the main neural network 104 is trained. In a particular aspect, the main neural network 104 is validated and provided (e.g., uploaded) to an aircraft to control (e.g., an elevator setting of) the aircraft. For example, one or more sensors of the aircraft provide state data to the main neural network 104 and an elevator setting of the aircraft is updated based on control inputs received from the main neural network 104.

The system 100 thus enables training of the main neural network 104 to control an aircraft. Training the main neural network 104 based on the flight simulator 146, as compared to pilot data, consumes fewer resources (e.g., time and money). The main neural network 104 trained using the flight simulator 146 is also likely to be more robust because the flight simulator 146 can be designed to simulate various scenarios, including scenarios that are not commonly encountered by pilots.

Figure 3:
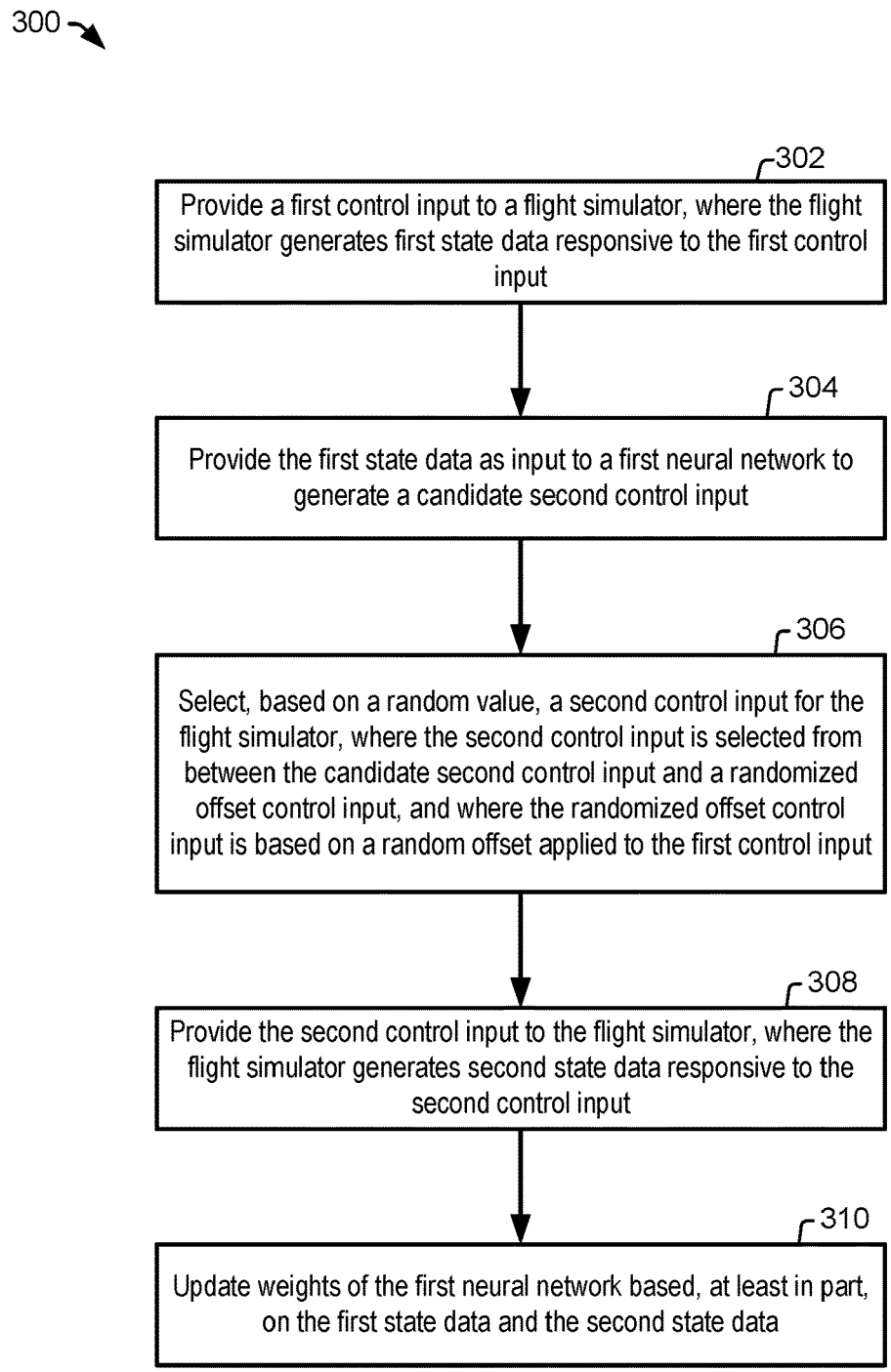
FIG. 3 is a diagram that illustrates a flow chart of an example of a method of training a neural network to control an aircraft.

FIG. 3 illustrates a method 300 of training a neural network to control an airplane. In a particular aspect, one or more operations of the method 300 are performed by the control input generator 144, the flight simulator 146, the neural network trainer 140, the system 100 of FIG. 1, or a combination thereof.

The method 300 includes providing a first control input to a flight simulator, at 302. For example, the control input generator 144 of FIG. 1 provides the control input 113 to the flight simulator 146, as described with reference to FIG. 1. The flight simulator 146 generates first state data responsive to the control input 113.

The method 300 also includes providing the first state data as input to a first neural network to generate a candidate second control input, at 304. For example, the flight simulator 146 of FIG. 1 provides the first state data to the main neural network 104 to generate the candidate control input 107, as described with reference to FIG. 1.

The method 300 further includes selecting, based on a random value, a second control input for the flight simulator, at 306. For example, the control input generator 144 of FIG. 1 selects, based on a random value, the control input 103 for the flight simulator 146, as described with reference to FIG. 1. The control input 103 is selected from between the candidate control input 107 and the randomized offset control input 191, as described with reference to FIG. 1. The randomized offset control input 191 is based on the random offset 109 applied to the control input 113, as described with reference to FIG. 1.

The method 300 also includes providing the second control input to the flight simulator, at 308. For example, the control input generator 144 provides the control input 103 to the flight simulator 146. The flight simulator 146 generates second state data responsive to the control input 103, as described with reference to FIG. 1.

The method 300 further includes updating weights of the first neural network based, at least in part, on the first state data and the second state data, at 310. For example, the neural network trainer 140 updates weights of the main neural network 104, based, at least in part, on the first state data and second state data, as described with reference to FIG. 1.

Figure 4:
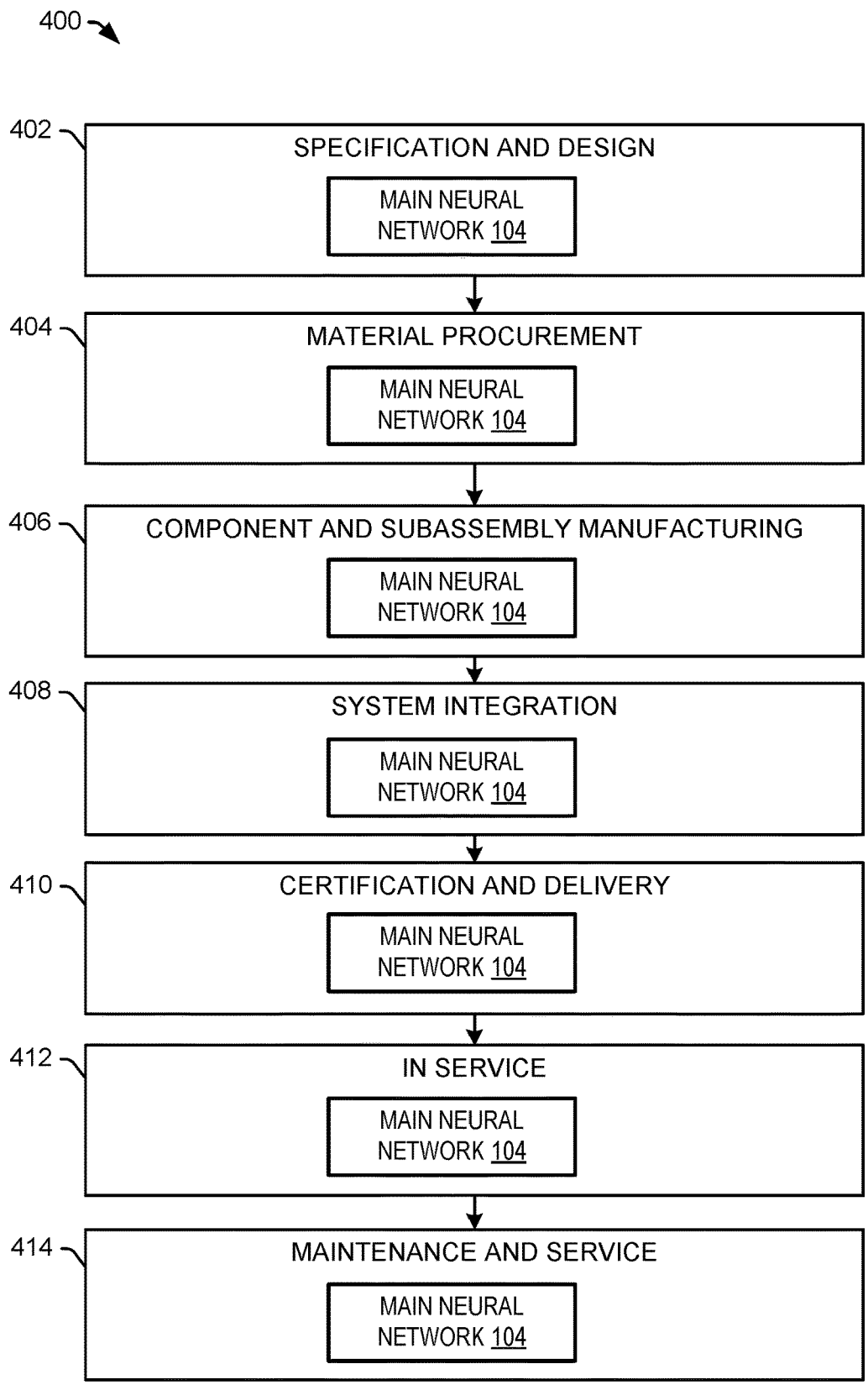
FIG. 4 is a flow chart illustrating a life cycle of an aircraft that includes a neural network of FIG. 1.

Referring to FIG. 4, a flowchart illustrative of a life cycle of an aircraft that is configured to be controlled by a neural network is shown and designated as method 400. During pre-production, the exemplary method 400 includes, at 402, specification and design of an aircraft, such as the aircraft 500 described with reference to FIG. 5. During specification and design of the aircraft, the method 400 may include specification and design of a neural network-based aircraft control system. The neural network-based aircraft control system includes or is configured to operate using the main neural network 104. At 404, the method 400 includes material procurement, which may include procuring materials for the neural network-based aircraft control system.

During production, the method 400 includes, at 406, component and subassembly manufacturing and, at 408, system integration of the aircraft. For example, the method 400 may include component and subassembly manufacturing of the neural network-based aircraft control system and system integration of the neural network-based aircraft control system. For example, the main neural network 104 can be loaded into the neural network-based aircraft control system. At 410, the method 400 includes certification and delivery of the aircraft and, at 412, placing the aircraft in service. Certification and delivery may include certification of the neural network-based aircraft control system to place the neural network-based aircraft control system in service. While in service by a customer, the aircraft may be scheduled for routine maintenance and service (which may also include modification, reconfiguration, refurbishment, and so on). For example, a new version of the main neural network 104 can be loaded to the neural network-based aircraft control system. At 414, the method 400 includes performing maintenance and service on the aircraft, which may include performing maintenance and service on the neural network-based aircraft control system.

Each of the processes of the method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 500 as shown in FIG. 5.

Figure 5:
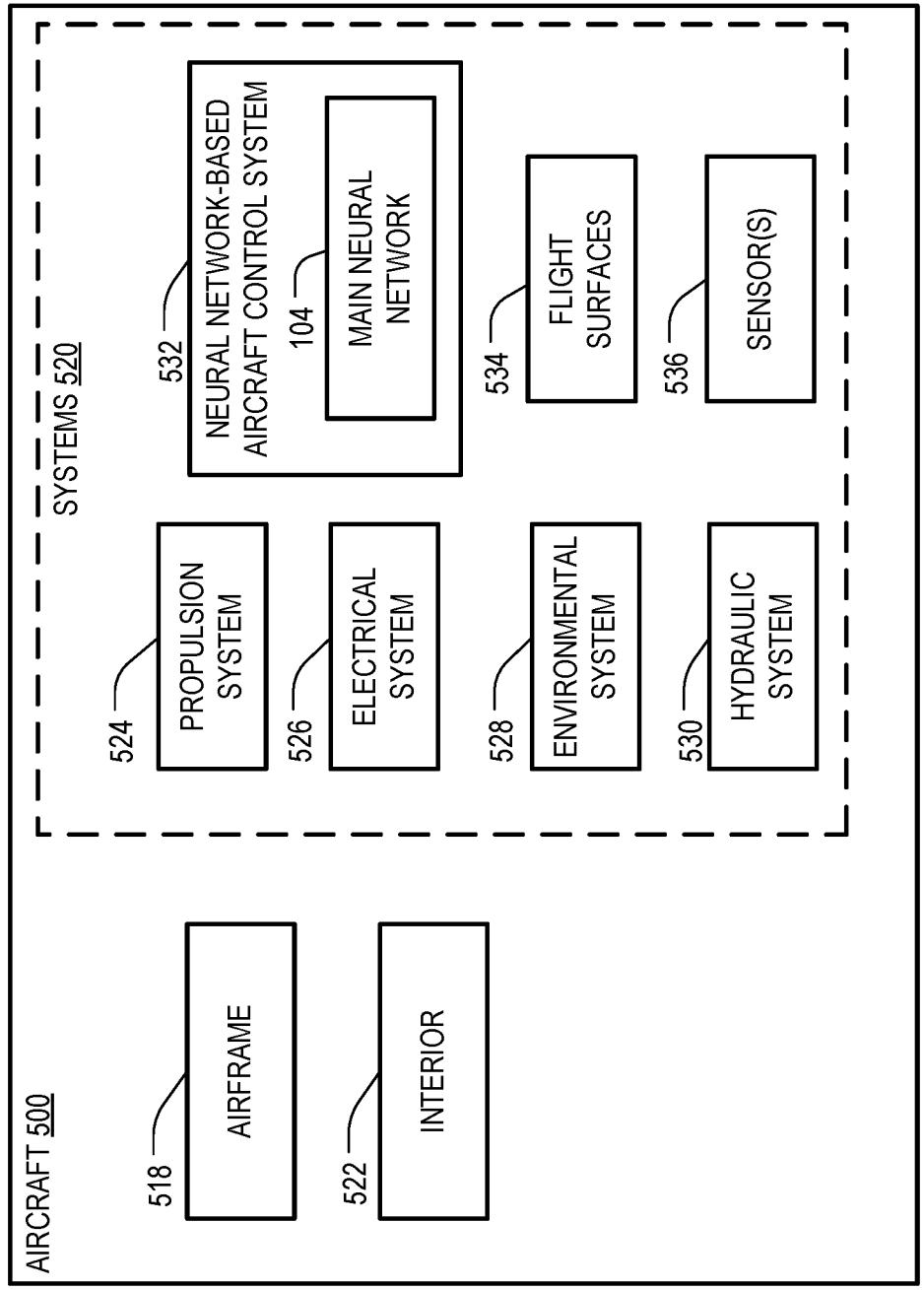
FIG. 5 is a diagram of an aircraft configured to be controlled by a neural network.

In the example of FIG. 5, the aircraft 500 includes an airframe 518 with a plurality of systems 520 and an interior 522. Examples of the plurality of systems 520 include one or more of a propulsion system 524, an electrical system 526, an environmental system 528, a hydraulic system 530, and a neural network-based aircraft control system 532, which includes or is configured to access the main neural network 104. Any number of other systems may be included. The neural network-based aircraft control system 532 is configured to receive sensor data from the one or more sensors 536 and to control operations of one or more other systems 520 of the aircraft 500, such as the position of one or more flight surfaces 534, based on output of the main neural network 104 responsive to sensor data.

Figure 6:
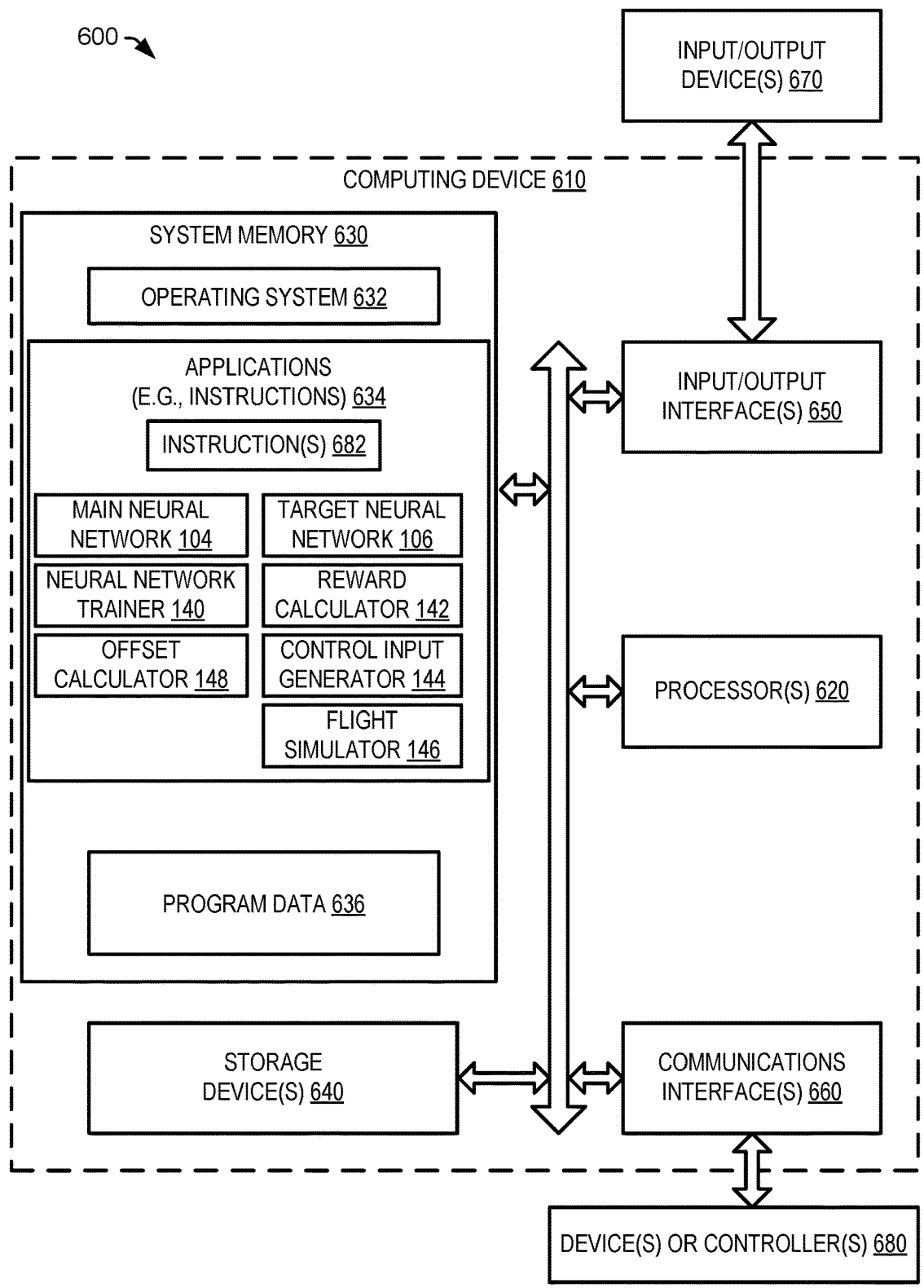
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1-5. In a particular aspect, the computing device 610 includes one or more components of the system 100 of FIG. 1, one or more servers, one or more virtual devices, or a combination thereof.

The computing device 610 includes one or more processors 620. The processor 620 is configured to communicate with system memory 630, one or more storage devices 640, one or more input/output interfaces 650, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636. For example, the system memory 630 stores the main neural network 104, the target neural network 106, the control input 103, the control input 113, the random offset 109, the candidate control input 107, the random offset control input 191, the randomization configuration value 193, the predicted main reward value 117, the predicted main reward value 127, the predicted target reward value 119, the reward value 111, the state data 105, the state data 115, the weights 121, or a combination thereof. In a particular aspect, the system memory 630 includes the memory 132 of FIG. 1.

The system memory 630 includes one or more applications 634 (e.g., sets of instructions) executable by the processor(s) 620. As an example, the one or more applications 634 include one or more instructions 682 executable by the processor(s) 620 to initiate, control, or perform one or more operations described with reference to FIGS. 1-5. To illustrate, the one or more applications 634 include the instructions 682 executable by the processor(s) 620 to initiate, control, or perform one or more operations described with reference to the main neural network 104, the target neural network 106, the neural network trainer 140, the reward calculator 142, the control input generator 144, the flight simulator 146, the offset calculator 148, or a combination thereof.

In a particular implementation, the system memory 630 includes a non-transitory, computer-readable medium (e.g., a computer-readable storage device) storing the instructions 682 that, when executed by the processor(s) 620, cause the processor(s) 620 to initiate, perform, or control operations to train a neural network to control an aircraft. The operations include providing a first control input to a flight simulator. The flight simulator generates first state data responsive to the first control input and provides the first state data as input to a first neural network to generate a candidate second control input. The operations also include selecting, based on a random value, a second control input for the flight simulator. The second control input is selected from between the candidate second control input and a randomized offset control input. The randomized offset control input is based on a random offset applied to the first control input. The operations further include providing the second control input to the flight simulator. The flight simulator generates second state data responsive to the second control input. The operations also include updating weights of the first neural network based, at least in part, on the first state data and the second state data.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 that enable the computing device 610 to communicate with one or more input/output devices 670 to facilitate user interaction. For example, the one or more input/output interfaces 650 can include a display interface, an input interface, or both. For example, the input/output interface 650 is adapted to receive input from a user, to receive input from another computing device, or a combination thereof. In some implementations, the input/output interface 650 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, N.J.). In some implementations, the input/output device 670 includes one or more user interface devices and displays, including some combination of buttons, keyboards, pointing devices, displays, speakers, microphones, touch screens, and other devices.

The processor(s) 620 are configured to communicate with devices or controllers 680 via the one or more communications interfaces 660. For example, the one or more communications interfaces 660 can include a network interface. The devices or controllers 680 can include, for example, the aircraft 500 of FIG. 5, one or more other devices, or any combination thereof. In a particular example, the neural network trainer 140, in response to determining that training of the main neural network 104 is complete, receiving a user input, or both, provides the main neural network 104 via the communications interfaces 660 to the aircraft 500.

In some implementations, a non-transitory, computer-readable medium (e.g., a computer-readable storage device) stores instructions that, when executed by one or more processors, cause the one or more processors to initiate, perform, or control operations to perform part or all of the functionality described above. For example, the instructions may be executable to implement one or more of the operations or methods of FIGS. 1-5. In some implementations, part or all of one or more of the operations or methods of FIGS. 1-5 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device for training a neural network to control an aircraft, the device comprising:
   a memory configured to store a first neural network;
   a control input generator configured to:
      provide a first control input to a flight simulator, wherein the flight simulator creates a simulation of use of the aircraft, and wherein the flight simulator is configured to generate first state data responsive to the first control input and to provide the first state data as input to the first neural network to generate a candidate second control input;
      select, based on a random value, a second control input for the flight simulator, wherein the second control input is selected from between the candidate second control input and a randomized offset control input, and wherein the randomized offset control input is based on a random offset applied to the first control input; and
      provide the second control input to the flight simulator, wherein the flight simulator is configured to generate second state data responsive to the second control input; and
   a neural network trainer configured to update weights of the first neural network based, at least in part, on the first state data and the second state data, wherein the first neural network is configured to receive sensor data from a plurality of sensors and is configured to control one or more systems of the aircraft based on the sensor data and the weights of the first neural network updated by the neural network trainer.

2. The device of claim 1, wherein the control input generator is configured to generate the randomized offset control input by randomly selecting a value from within a range centered on a value of the first control input.

3. The device of claim 1, wherein the control input generator is configured to determine a reward value based on an altitude change and a pitch indicated by the second state data, and wherein the weights are updated based, at least in part, on the reward value.

4. The device of claim 3, wherein the first neural network comprises a plurality of output nodes corresponding to a plurality of control inputs, wherein a first output node of the plurality of output nodes corresponds to the candidate second control input, wherein the first neural network is configured to receive the first state data and to generate a plurality of predicted reward values as output values for the plurality of output nodes, and wherein a first predicted reward value for the first output node is a highest predicted reward value from the plurality of predicted reward values.

5. The device of claim 4, wherein the memory is further configured to store a second neural network, and wherein the neural network trainer is further configured to:
   provide the second state data as a second input to the second neural network, wherein the second neural network comprises a plurality of second output nodes corresponding to the plurality of control inputs, and wherein the second neural network is configured to receive the second state data and to generate a plurality of second predicted reward values as second output values for the plurality of second output nodes; and
   determine that a second predicted reward value for a second output node is a highest predicted reward value from the plurality of second predicted reward values, wherein the weights of the first neural network are updated based on the reward value, the first predicted reward value, and the second predicted reward value.

6. The device of claim 5, wherein the second neural network is a delayed copy of the first neural network.

7. A method of training a neural network to control an aircraft, the method comprising:
   providing a first control input to a flight simulator, wherein the flight simulator creates a simulation of use of the aircraft, and wherein the flight simulator generates first state data responsive to the first control input and provides the first state data as input to a first neural network to generate a candidate second control input;
   selecting, based on a random value, a second control input for the flight simulator, wherein the second control input is selected from between the candidate second control input and a randomized offset control input, and wherein the randomized offset control input is based on a random offset applied to the first control input;
   providing the second control input to the flight simulator, wherein the flight simulator generates second state data responsive to the second control input; and
   updating weights of the first neural network via a neural network trainer based, at least in part, on the first state data and the second state data, wherein the first neural network is configured to receive sensor data from a plurality of sensors and is configured to control one or more systems of the aircraft based on the sensor data and the weights of the first neural network updated by the neural network trainer.

8. The method of claim 7, wherein the candidate second control input is selected as the second control input in response to determining that the random value is less than or equal to a randomization configuration value.

9. The method of claim 7, wherein the randomized offset control input is selected as the second control input in response to determining that the random value is greater than a randomization configuration value.

10. The method of claim 7, further comprising updating a randomization configuration value based on a count of iterations of training the first neural network, wherein the second control input is selected based on the randomization configuration value.

11. The method of claim 7, further comprising generating the randomized offset control input by randomly selecting a value from within a range centered on a value of the first control input.

12. The method of claim 7, wherein the first state data indicates at least one of an altitude, a speed, a pitch, an elevator setting, an altitude change, a speed change, or a pitch change.

13. The method of claim 7, further comprising determining a reward value based on an altitude change and a pitch indicated by the second state data, wherein the weights are updated based, at least in part, on the reward value.

14. The method of claim 13, wherein the first neural network comprises a plurality of output nodes corresponding to a plurality of control inputs, wherein a first output node corresponds to the candidate second control input, wherein the first neural network is configured to receive the first state data and to generate a plurality of predicted reward values as output values for the plurality of output nodes, and wherein a first predicted reward value for the first output node is a highest predicted reward value from the plurality of predicted reward values.

15. The method of claim 14, further comprising:
   providing the second state data as a second input to a second neural network, wherein the second neural network comprises a plurality of second output nodes corresponding to the plurality of control inputs, and wherein the second neural network is configured to receive the second state data and to generate a plurality of second predicted reward values as second output values for the plurality of second output nodes; and determining that a second predicted reward value for a second output node is a highest predicted reward value from the plurality of second predicted reward values, wherein the weights of the first neural network are updated based on the reward value, the first predicted reward value, and the second predicted reward value.

16. The method of claim 15, wherein the second neural network is a delayed copy of the first neural network.

17. The method of claim 15, further comprising, based on determining that a count of iterations of training the first neural network since a previous update of second weights of the second neural network is greater than a threshold, updating the second weights of the second neural network based on the weights of the first neural network.

18. A non-transitory computer-readable storage device storing instructions that, when executed by one or more processors, cause the one or more processors to perform operations comprising:

providing a first control input to a flight simulator, wherein the flight simulator creates a simulation of use of an aircraft, wherein the flight simulator generates first state data responsive to the first control input and provides the first state data as input to a first neural network to generate a candidate second control input;

selecting, based on a random value, a second control input for the flight simulator, wherein the second control input is selected from between the candidate second control input and a randomized offset control input, and wherein the randomized offset control input is based on a random offset applied to the first control input;

providing the second control input to the flight simulator, wherein the flight simulator generates second state data responsive to the second control input; and updating weights of the first neural network via a neural network trainer based, at least in part, on the first state data and the second state data, wherein the first neural network is configured to receive sensor data from a plurality of sensors and is configured to control one or more systems of the aircraft based on the sensor data and the weights of the first neural network updated by the neural network trainer.

19. The non-transitory computer-readable storage device of claim 18, wherein the first state data indicates at least one of an altitude, a speed, a pitch, an elevator setting, an altitude change, a speed change, or a pitch change.

20. The non-transitory computer-readable storage device of claim 18, wherein the operations further comprise determining a reward value based on an altitude change and a pitch indicated by the second state data, wherein the weights are updated based, at least in part, on the reward value.

* * * * *